United States Patent [19]

Matsumoto

[11] Patent Number: 4,724,463
[45] Date of Patent: Feb. 9, 1988

[54] SELF-ALIGNING PHOTOGRAPHIC PRINTING APPARATUS

[75] Inventor: Fumio Matsumoto, Tokyo, Japan

[73] Assignee: Fuji Photo Film Co., Ltd., Kanagawa, Japan

[21] Appl. No.: 880,971

[22] Filed: Jul. 1, 1986

[30] Foreign Application Priority Data

Jul. 5, 1985 [JP] Japan .................................. 60-148053
Aug. 16, 1985 [JP] Japan .................................. 60-180315

[51] Int. Cl.⁴ ........................................... G03B 29/00
[52] U.S. Cl. ...................................... 355/29; 355/41; 355/50
[58] Field of Search ................. 355/28, 29, 50, 51, 355/41

[56] References Cited

U.S. PATENT DOCUMENTS

| | | | |
|---|---|---|---|
| 3,516,741 | 6/1970 | Thaddey | 355/29 X |
| 4,251,156 | 2/1981 | Zimmerman et al. | 355/41 |
| 4,576,469 | 3/1986 | Shiga et al. | 355/29 |
| 4,641,019 | 2/1987 | Inatsuki | 355/29 |

Primary Examiner—Richard A. Wintercorn
Attorney, Agent, or Firm—Sughrue, Mion, Zinn, Macpeak & Seas

[57] ABSTRACT

A photographic printing apparatus comprising a carrier section for positioning the image frame of an original negative film strip to print said image frame, a transporter for transporting said original negative film strip, an optical detector for obtaining image information of the image frame at the carrier section, a cutter for cutting the original negative film strip into several pieces each of which has a predetermined number of frames, means for inserting each of the several pieces into a negative carrier sleeve, and a controller for controlling the transporter, the cutter and the inserting means in accordance with the image formation detected by the image information detector at the printing section. Thereby, a plurality of original negative film strips can be continuously and automatically printed without connecting and separating the original negative film strip. Furthermore, each of the serveral pieces can be continuously and automatically inserted into the negative carrier sleeves.

12 Claims, 29 Drawing Figures

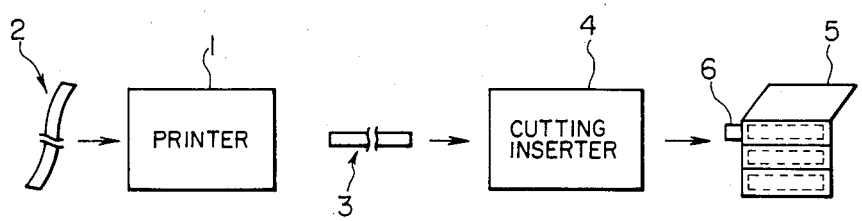
FIG. 1
PRIOR ART
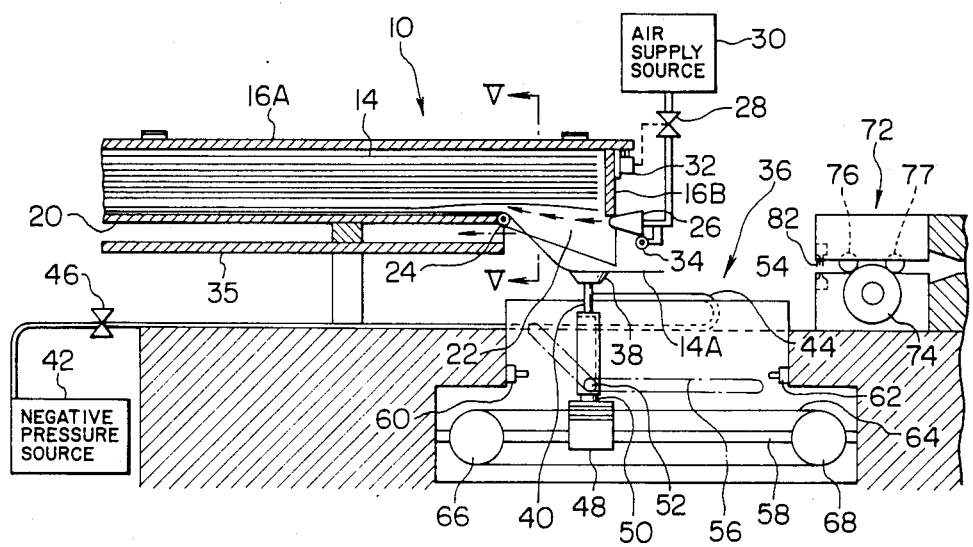
FIG. 4
FIG. 5

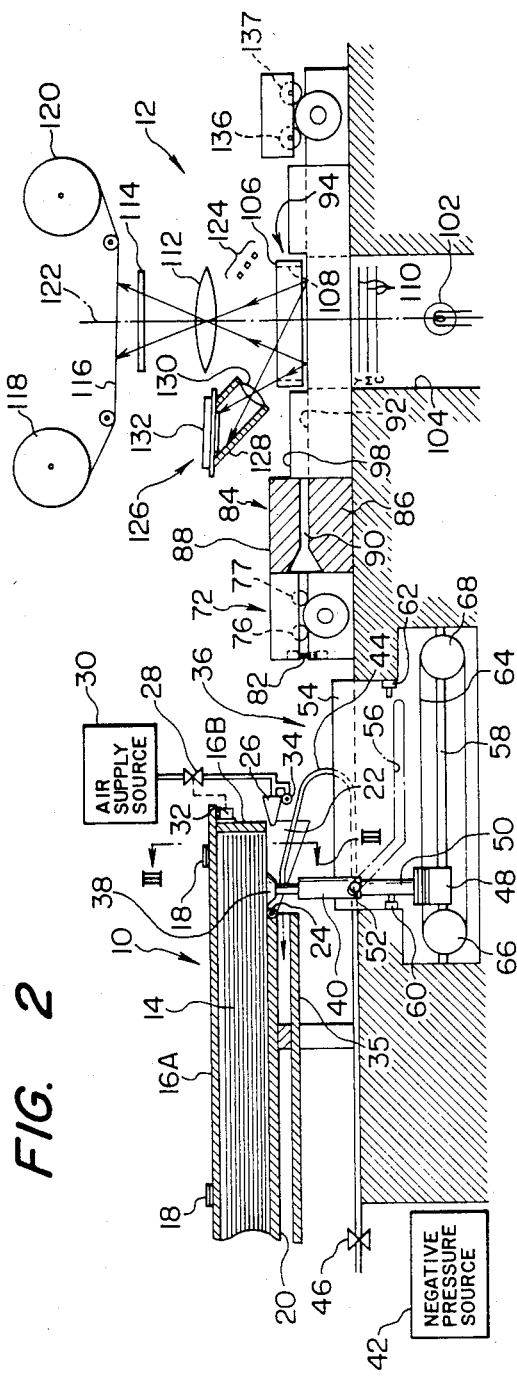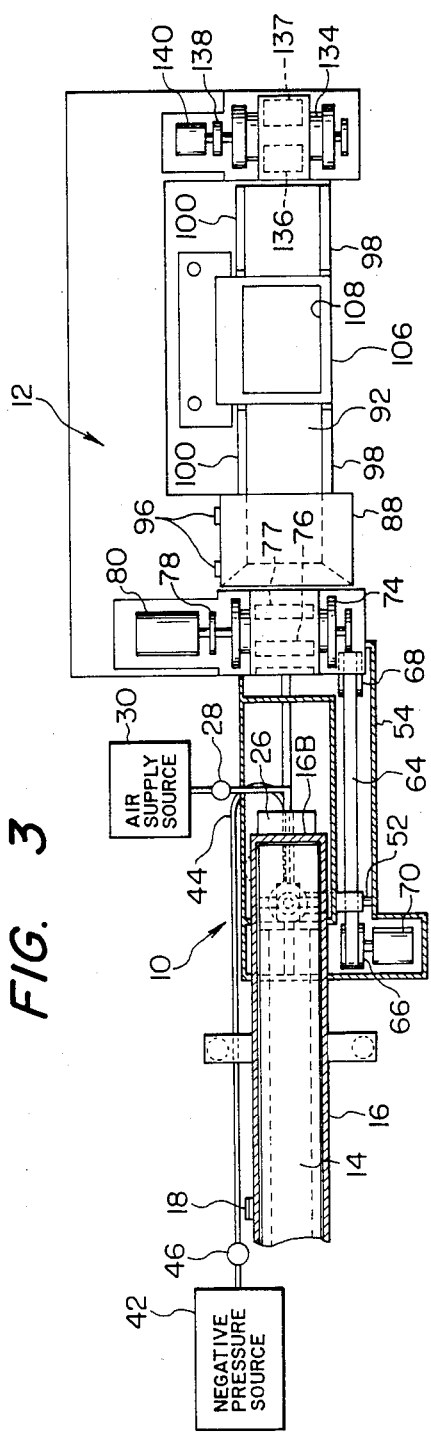

| 250 | | | | | | |
|---|---|---|---|---|---|---|
| 16 | 59 | 58 | 55 | | 43 | 31 |
| 12 | 57 | 56 | 55 | | 58 | 13 |
| 17 | 55 | 55 | 51 | | 56 | 16 |
| 15 | 52 | 52 | 47 | | 53 | 20 |
| 14 | 49 | 48 | 46 | | 49 | 23 |
| 12 | 47 | 46 | 45 | | 49 | 27 |
| 5 | 17 | 17 | 16 | | 45 | 30 |

FIG. 11(A)

| 150 | 141 | 137 | 121 | 138 | 148 | 151 | 140 | 133 | 135 | 120 | 122 | 108 | 133 | 123 | 130 | 145 | 150 |
|---|---|---|---|---|---|---|---|---|---|---|---|---|---|---|---|---|---|
| 148 | 132 | 71 | 50 | 61 | 70 | 85 | 80 | 70 | 72 | 65 | 87 | 76 | 85 | 80 | 115 | 148 | 153 |
| 151 | 140 | 70 | 43 | 20 | 13 | 15 | 14 | 16 | 15 | 14 | 16 | 15 | 18 | 78 | 103 | 150 | 155 |
| 150 | 135 | 69 | 41 | 18 | 5 | 4 | 5 | 6 | 4 | 5 | 7 | 6 | 17 | 69 | 94 | 142 | 150 |
| 142 | 122 | 60 | 38 | 17 | 6 | 0 | 0 | 0 | 0 | 0 | 0 | 8 | 15 | 53 | 82 | 131 | 141 |
| 139 | 120 | 55 | 33 | 15 | 5 | 0 | 0 | 0 | 0 | 0 | 0 | 7 | 16 | 58 | 88 | 140 | 145 |
| 138 | 120 | 62 | 40 | 19 | 8 | 0 | 0 | 0 | 0 | 0 | 0 | 6 | 14 | 43 | 70 | 110 | 140 |
| 143 | 125 | 65 | 40 | 18 | 7 | 0 | 0 | 0 | 0 | 0 | 0 | 8 | 17 | 47 | 73 | 108 | 148 |
| 147 | 130 | 80 | 48 | 21 | 6 | 7 | 5 | 4 | 6 | 5 | 7 | 7 | 20 | 55 | 81 | 120 | 155 |
| 150 | 138 | 89 | 52 | 30 | 20 | 18 | 13 | 10 | 17 | 15 | 16 | 20 | 25 | 40 | 73 | 115 | 153 |
| 153 | 144 | 93 | 65 | 54 | 51 | 46 | 38 | 32 | 45 | 43 | 48 | 58 | 60 | 65 | 80 | 105 | 148 |
| 155 | 151 | 155 | 140 | 113 | 110 | 119 | 120 | 140 | 150 | 151 | 140 | 151 | 155 | 150 | 150 | 152 | 150 |

FIG. 11(B)

| 53 | 38 | 28 | 26 | 27 | 29 | 27 | 25 | 25 | 30 | 35 | 33 | 31 | 29 | 36 | 37 | 49 | 71 |
|---|---|---|---|---|---|---|---|---|---|---|---|---|---|---|---|---|---|
| 50 | 31 | 5 | 4 | 5 | 7 | 6 | 4 | 4 | 6 | 7 | 7 | 5 | 4 | 5 | 6 | 40 | 64 |
| 51 | 35 | 6 | 0 | 0 | 0 | 0 | 0 | 0 | 0 | 0 | 0 | 0 | 0 | 0 | 8 | 43 | 67 |
| 50 | 28 | 4 | 0 | 0 | 0 | 0 | 0 | 0 | 0 | 0 | 0 | 0 | 0 | 0 | 6 | 37 | 63 |
| 48 | 28 | 4 | 0 | 0 | 0 | 0 | 0 | 0 | 0 | 0 | 0 | 0 | 0 | 0 | 6 | 37 | 62 |
| 61 | 33 | 5 | 0 | 0 | 0 | 0 | 0 | 0 | 0 | 0 | 0 | 0 | 0 | 0 | 7 | 39 | 68 |
| 73 | 42 | 7 | 0 | 0 | 0 | 0 | 0 | 0 | 0 | 0 | 0 | 0 | 0 | 0 | 5 | 35 | 65 |
| 70 | 45 | 7 | 0 | 0 | 0 | 0 | 0 | 0 | 0 | 0 | 0 | 0 | 0 | 0 | 5 | 35 | 66 |
| 66 | 38 | 5 | 0 | 0 | 0 | 0 | 0 | 0 | 0 | 0 | 0 | 0 | 0 | 0 | 6 | 38 | 70 |
| 68 | 39 | 6 | 0 | 0 | 0 | 0 | 0 | 0 | 0 | 0 | 0 | 0 | 0 | 0 | 8 | 43 | 78 |
| 79 | 45 | 8 | 7 | 7 | 5 | 6 | 3 | 3 | 5 | 4 | 5 | 3 | 4 | 4 | 8 | 45 | 72 |
| 80 | 50 | 41 | 38 | 38 | 35 | 37 | 30 | 33 | 37 | 35 | 40 | 33 | 35 | 38 | 43 | 61 | 77 |

SELF-ALIGNING PHOTOGRAPHIC PRINTING APPARATUS

BACKGROUND OF THE INVENTION

1. Field of the Invention

The present invention relates to a photographic printing apparatus.

It relates particularly to a photographic printing apparatus in which a photographic printing can be continuously effected. The original negative film strip is cut into strips, each of which has a predetermined length, after the printing process of the original negative film strip has been effected. Each of the cut strips is then automatically inserted into a negative carrier sleeve.

2. Background Art

Hitherto, in order to continuously print a plurality of original negative film strips, it has been necessary to connect the original negative film strips with each other and to wind up the original negative film strips on a reel. The connected strips are then cut into short strips after printing has been completed. The conventional photographic printing apparatus has the disadvantage of requiring complex operations such as the joining and cutting of the many original negative film strips. Of course, extra time is required for these operations. Often, a damaged image results on the frames of the film strip.

Furthermore, in a conventional system for photographic printing as shown in FIG. 1, an original negative film strip, such as a 36-exposure film strip, which was exposed and developed, is printed by a printer 1. Specifically, the photographic image in each frame of the original film strip is printed by moving the film strip frame-by-frame in a printing section of the printer 1. Thus, all of the frames of the film strip 1 to be printed are processed. The film strip 3 ejected from the printer 1 is carried to a cutting inserter 4 in which the original negative film strip is manually cut into predetermined pieces, such as six frame strips each of the cut strips 6 having six frames. Then, the cut strips 6, each of which has a predetermined length, are manually or automatically injected into a negative carrier sleeve 5 to present them to the client. Therefore, it is necessary to transport the cut strip from the printer 1 to the cutting inserter 4. However, it is difficult to coordinate the printing operation to that of the cutting inserter 4.

SUMMARY OF THE INVENTION

Accordingly, it is an object of the present invention to provide a photographic printing apparatus in which a plurality of original film strips can be continuously printed without any connection between the film strips.

Furthermore, it is another object of the present invention to provide a photographic printing apparatus in which a cutting inserter automatically cuts the original film strip, which has completed the printing operation, into strips having a predetermined length and the cut strips are automatically inserted into a negative carrier sleeve.

In the operation of the photographic printing apparatus of the invention, the multiple original film strips received in the receiving means in a stacked form are sequentially fed to the printing section from the topmost or bottommost one of the film strips in the stack. The image frame of the film strip is positioned at the printing position by the carrier section and the strip is sequentially fed. At this time the image information is optically detected in response to which the strip is transported to the printing section and the frame is positioned.

Thus, the plural original film strips are continuously and automatically printed without connection therebetween.

According to the present invention there is provided a photographic printing apparatus comprising a carrier section for positioning an image frame of the original negative film strip, means for transporting the original negative film strip, means for optically detecting the image information at the carrier section, means for cutting the original negative film strip into strips having a predetermined number of frames, means for controlling the transporting means and cutting means in accordance with the output from the image information detecting means and means for automatically inserting the cut strips into a negative carrier sheet.

BRIEF DESCRIPTION OF THE DRAWINGS

Other features, additional objects, and many of the attendant advantages of the present invention will readily be appreciated as they become better understood by reference to the following detailed description of a preferred embodiment when considered in connection with the appended drawings in which:

FIG. 1 is a view of the schematic constitution of a conventional photographic printing apparatus.

FIG. 2 is a vertical section showing a first embodiment of the photographic printing apparatus of the present invention;

FIG. 3 is a plan view of the apparatus shown in FIG. 2;

FIG. 4 is an elongated vertical section of a part of the apparatus shown in FIG. 2;

FIG. 5 is a sectional view taken along the line V—V in FIG. 4;

FIGS. 11 (A) and (B) are views showing two examples of image density information used for frame detection;

FIG. 15 is a vertical section of the film strip supply section;

FIG. 16 is its plan view;

FIG. 17 is a view explaining the operation of a suction cup of the film strip supply section;

FIG. 18 is a sectional view taken along the line XVIII—XVIII in FIG. 17;

FIG. 19 is a view explaining the operation of the suction cup of film strip supply section;

FIG. 20 is a view showing the schematic constitution of the photographic printing apparatus;

FIGS. 21 (A) and (B) are respectively a side view and a plan view showing the constitution of the apparatus in FIG. 20 in more detail;

FIG. 22 is a perspective view of a negative carrier sheet insertion device;

FIG. 23 is a flowchart showing the operation of the photographic printing apparatus of FIG. 21; and FIG. 24 is a diagram of a circuit for generating a cut signal.

DETAILED DESCRIPTION OF THE PREFERRED EMBODIMENTS

Figure 6:
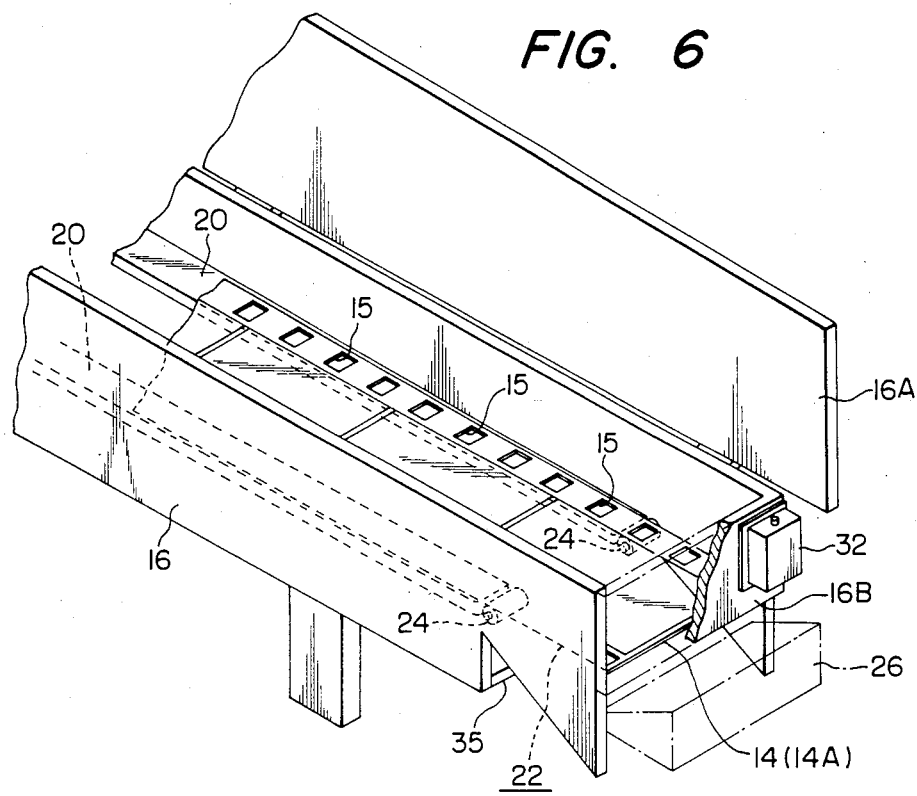
FIG. 6 is a partially-broken perspective view showing means for receiving original negative film strips.

Referring to FIGS. 2 to 19, a first embodiment of the photographic printing apparatus 12 of the present invention is explained hereafter.

As shown in FIGS. 2 and 5, a supplying device 10 is included in the photographic printing apparatus 12. A plurality of original negative film strips 14, which have previously completed a development process, are received in a receiving box 16 in a stacked form. The receiving box 16 has a top plate 16A hinged to the receiving box 16 through a hinge 18. The plural original negative film strips 14 are inserted into the receiving box 16 by opening the top plate 16A.

Within the receiving box 16, a pair of level, spaced-apart supporting plates 20 support the stacked film strips at both sides of the film strip in the width direction. As is clearly shown in FIG. 6, the perforated portions of the film strip 14 (that is, having perforations 15) are supported by the supporting plates 20. A is clearly shown in FIG. 2, the supporting plates 20 are separated in the longitudinal direction from an end plate 16B of the receiving box 16, thereby providing film strip take-out opening 22 between the end portion of the bottom supporting plates 20 and the end plate 16B. There is provided a guide roller 24 at the end point portion of each of the supporting plates 20 opposite to the film strip take-out opening 22, thereby reducing frictional resistance caused when the lowermost film strip 14 is taken out from the supporting device 10.

A nozzle 26 blows air from the lower portion of the end plate 16B toward the film strip take-out opening 22. The nozzle 26 is connected to an air supply source 30 through a valve 28. As shown in FIG. 4, the air from the nozzle 26 flows, in the direction of the arrows, into the region between the lowermost film strip 14A and the next upper film strip when the lowermost film strip 14A is taken out from the film strip take-out opening 22. Therefore the central portion of the lowermost film strip 14A is separated from the next upper film strip to thereby reduce the frictional resistance between them. The separation is shown in FIG. 5.

The valve 28 is controlled by a switch 32 which detects whether the top plate 16A is open or closed. The valve 28 is closed when the top plate 16 is opened in order that a stack of the original negative film strips may be inserted into the receiving box 16, thereby stopping the air supply to the nozzle 26. A guide roller 34 at the lower portion of the nozzle 26 reduces frictional resistance between the film strip 14 and the roller 34 when the lowermost film strip 14A contacts the roller 34 during its movement.

As shown in FIG. 5, an air duct is formed between the lowermost film strip 14A, held by the supporting plate 20, and a bottom plate 35 at the lower portion of the receiving box 16. As a result, the back (lower) surface of the lowermost film strip 14A is cleaned by the air jet from the nozzle 26 when the lowermost film strip 14A is in the flat position shown in FIG. 2. The other end (not shown) of the air duct is opened to the exterior to exhaust the air used for the cleaning of the lowermost film strip 14A.

A suction cup (acetabulum) 38 of a suction transport apparatus 36 moves vertically and horizontally between the film strip take-out opening 22 and a photographic printing device 12, to thereby feed the lowermost film strip 14A to the photographic printing device 12.

The suction cup 38 is mounted on the upper end of a vertically movable shaft 40 and is connected to a negative pressure source 42 through a flexible tube 44 and a valve 46. Therefore the acetabulum 38 can hold and move the end portion of the lowermost film strip 14A in the longitudinal direction.

Figure 7:
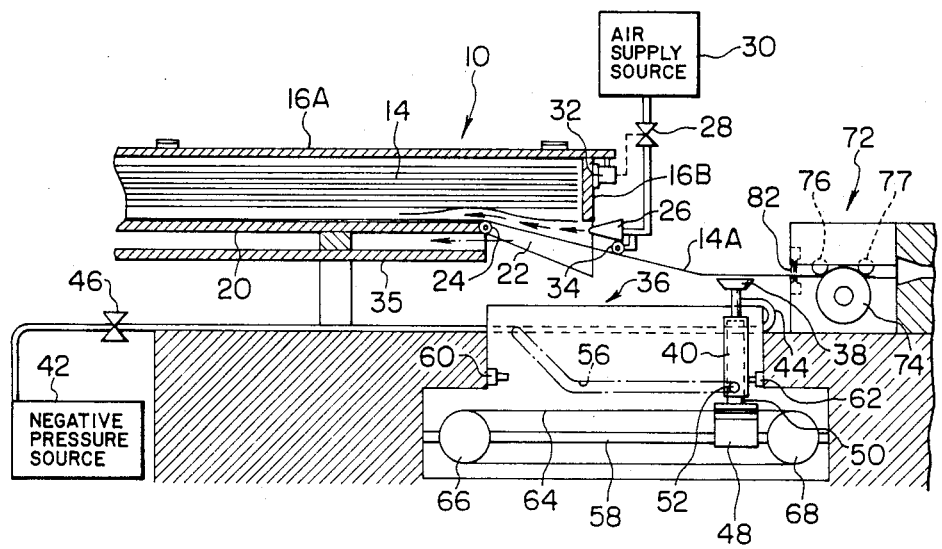
FIG. 7 is a vertical section for explaining the operation of a film strip supply section.

The vertically movable shaft 40 is coaxially and slidably mounted on a supporting shaft 50 standing on a movable base 48. The shaft 40 has a pin 52 projected from the periphery of the shaft 40 in the radial sidewards direction, the pin 52 being inserted into a guide slot 56. The slot 56 has an inclined portion for guiding the pin 52 (and thus the suction cup 38) from the position as shown in FIG. 2 to the position as shown in FIG. 4 when the movable base 48 is moved along a guide rod 58 as illustrated. The slot 56 also has a horizontal portion for guiding the pin 52 (and thus the suction cup 38) from the position as shown in FIG. 4 to the position as shown in FIG. 7 when the movable base 48 is further moved along the guide rod 58 as illustrated. By means of the inclined portion, the suction cup 38 can be moved upwardly and downwardly and, by means of the horizontal portion, the suction cup 38 can be moved in the horizontal direction toward or away from the photographic printing device 12. The movable base 48 can be moved from the position as shown in FIG. 2 at which a limit switch 60 contacts the supporting shaft 52 to the position as shown in FIG. 7 at which a limit switch 62 contacts the supporting shaft 52.

The movable base 48 is connected to a portion of an endless belt 64 wrapped between a pair of pulleys 66 and 68 disposed apart from each other. The pulley 66 is driven by an electric motor 70 (FIG. 3) thereby moving between the state shown in FIG. 2 and the state shown in FIG. 7.

As shown in FIG. 7, when the suction cup 38 reaches the end of the stroke, the end point of the film strip 14A held by the suction cup 38 is fed to a supply section 72. In the supply section 72, the film strip 14A is pressed to a drive roller 74 driven by a drive motor 80 through a reducer 78 as shown in FIG. 3. Furthermore, at the upstream or entry portion of the supply section 72, a brush 82 removes dust adhering the moving film strip 14.

As shown in FIG. 2, a guide member 84 smoothly feed the film strip 14 to the photographic device 12 at the downstream of the supply section 72. The guide member 84 is composed of a lower guide block 86 and an upper guide block 88 and there is provided a film guiding slit 90 between the upper and lower guide blocks 86 and 88. The upstream portion of the film guiding slit 90, corresponding to the illustrated left side, is enlarged to easily funnel the film strip 14 into the film guiding slit 90. Thus, the film strip 14 fed from the supply section 72 is easily guided to pass through the film guiding slit 90 and then advanced to a printing section 94 through a guiding channel 92. The upper guide block 88 is hinged to the lower guide block 86 by hinges 96 (FIG. 3). Therefore, the film guide slit 90 can be opened by rotating the upper guide block 86. The guide channel 92 has guide walls 98 and 100 at both sides in the width direction in order to exactly guide the film strip 14 to the printing section 94.

A through hole 104, located at a central portion of the guide channel 92 in the longitudinal direction, passes light emitted from a light source 102 mounted at the lower portion of the guide channel 92. A negative film carrieir 106 is disposed at the central portion of the guide channel 92 in the printing section 94. The negative film carrier 106 has fixed aperture 108 and the negative film carrier 106 can be selectively replaced by other carriers having a different size of aperture in accordance with the frame size of the film strip 14. The film strip 14 is transported in the gap formed between the guide channel 92 and the negative film carrier 106. There are arranged complementary color filters 110 of yellow (Y), magenta (M) and cyan (C) in the through-hole at the lower portion of the printing section 94. These filters 110 are illuminated by the light source 102.

At the upper portion of the printing section 94, there are disposed an optical system 112, a back shutter 114 and a printing paper roll 116. Both ends of the printing paper roll 116 are wound on a supply reel 118 and a winding reel 120.

The printing paper 116 fed from the supply reel 118 to the winding reel 120, is exposed to image lighty in synchronism with the feeding of each from of the film strip 14 a position on an optical axis 122. After the exposure, the printing paper 116 is wound on the winding reel 120 and then developed by a developing device (not shown).

At the position adjacent to the optical system 112, there is disposed a photosensor array 124, such as photodiodes opposite to the frame image of the film strip 14. The photosensor array 124 is used for detecting image density information of the three primary colors, i.e., red (R), green (G) and blue (B). The three complementary color filters 110 are controlled for printing in accordance with the output signal from the photosensor array 124.

An image detecting device 126 detects a LATD (Large Area Transmittance Density, referred to simply as LATD hereafter) of the image in each frame of the film strip 14. The image information detecting device 126 faces the film strip 14 and is disposed opposite to the photosensor 124 with respect to an optical axis 122. The image information detecting device 126 is composed of an optical system 130 for focusing the image on each frame of the film strip 14, a two-dimensional image sensor 128 on which the image of the frame is focused and a substrate 132 mounted on the back surface of the image information detecting device 126. A processor circuit, composed of, for instance, an integrated circuit, is included on the substrate 132 and electrically processes the image.

Figure 8:
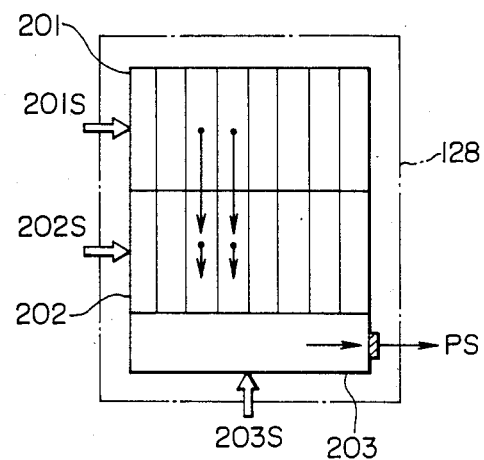
FIG. 8 is a view showing a schematic design of a two-dimensional image sensor.

Referring to FIG. 8, the two-dimensional image sensor 128 is illustrated. It is composed of an imaging section 201 for optically imaging the image on the frame, a storing section 202 for storing the electric charge transferred from the imaging section 201 and an output register section 203. By controlling driving signals 201S to 203S from a driving circuit 200, the two-dimensional image information is photoelectrically converted, thereby being output as an analog image signal PS from the output register section 203.

Figure 9:
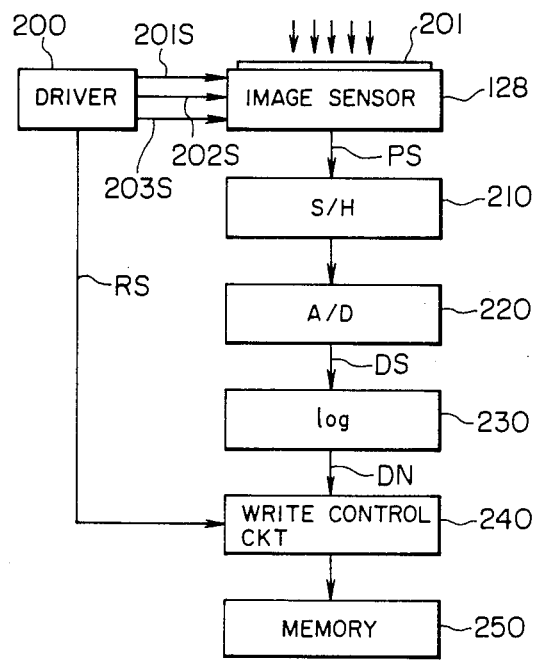
FIG. 9 is a flowchart showing the control operation of the two-dimensional image sensor.

Referring to FIG. 9, the circuit construction on the substrate 132 is illustrated. As mentioned above, the two-dimensional image sensor 128 is driven by the driving signals 201S to 203S from the driving circuit 200, and the light incident on the imaging section 201 of the two-dimensional image sensor 128 is output as the image signal PS from the output register section 203. Furthermore, the image signal PS is sampled at a predetermined sampling period by a sample-and-hold circuit 210. The sampled value is converted to a digital signal DS by an analog-to-digital converter 220. The digital signal DS from the analog to digital converter 220 is further converted by a logarithmic conversion circuit 230 to a density signal DN. The density signal DN is written in the memory 250 through a write controlling circuit 240.

The write controlling circuit 240 is controlled by a read speed signal RS for reading the image information at a constant speed. The two-dimensional image sensor 128 is synchronously driven by the driving circuit 200 so that the density signal DN is sequentially written into a predetermined area of a memory 250 in accordance with the speed at which the two-dimensional image sensor 128 is driven.

In the case where the printing operation is carried out by using the photosensor 124 for the LATD measurement, that is, without using the image information detecting device 126, the transmitted light passing through the film strip 14, halted at the printing section, is detected by the photosensor 124. The complementary color filters 110 are adjusted in accordance with the image signal of each of the three primary colors R, G and B. The back shutter 114 is opened to thereby expose the printing paper 116 with a determined exposure amount.

Figures 10A, 10B:
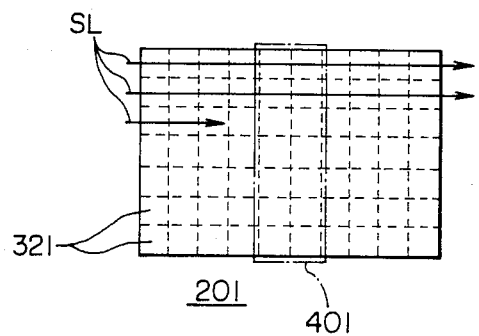
FIGS. 10 (A) and (B) are views showing the correspondence between divided picture elements of the original negative film strip and memorized data.

In this embodiment, the two-dimensional image sensor 128 is driven by applying the predetermined driving signals 201S to 203S from the driving circuit 200 to the image sensor 128. Therefore the transmitted light passing through the film strip 14 placed on the printing section is received by the two-dimensional image sensor 128 through the optical system 130. The two-dimensional image sensor 128 may be arranged, as shown in FIG. 10(A), such that the entire picture area of the film strip 14 is divided into many small picture elements 321 which are regularly arranged, and all of the picture elements 321 are sequentially scanned along scanning line SL.

After completion of the scanning of the entire picture, the image signal PS is output from the output register section 203 of the two-dimensional image sensor 128. The image signal PS is sampled and held by the sample-and-hold circuit 210, the sampled value being converted to the digital signal DS by the analog-to-digital converter 220. The digital signal DS output from the A/D converter 220 is converted by the logarithmic conversion circuit 230 to thereby obtain the density signal DN. The density signal DN is stored in the memory 250 as a digital value representing the density of the frame image in an arrangement corresponding to the picture elements 321 as shown in FIG. 10(A) under the control of the write controlling circuit 240. An example of the arrangement of digital density values DN stored in the memory 250 is shown in FIG. 10(B).

Thus, the digital value of each picture element of the film strip 14 or the density value of each picture element of the film strip 14 with respect to the three primary colors is stored in the memory 250. Therefore, it is possible to utilize the digital value of each picture element. Therefore, the density values stored in the memory 250, as shown in FIG. 10(B), are read out and processed to determine the amount of exposure light for the printing operation or to compensate the amount of exposure light.

As shown in FIGS. 2 and 3, a driving roller 134 and nip rollers 136 and 137 feed the original negative film strip 14 at the downstream end of the printing section 94. The driving roller 134 is selectively operated by a drive motor 140 through a reducer 138 so that the film strip 14 can be taken out of the printing apparatus 12.

It is desirable that the nip rollers 76 and 77 of the supply section 72 and the nip rollers 136 and 137 disposed at the downstream of the printing section 94 can be moved upwardly in hinges so that they can be removed from the driving rollers 74 and 134.

The operation of the photographic printing apparatus of the present invention is explained hereinafter.

The plural original negative film strips 14 which have previously completed a development process are, as shown in FIG. 5, inserted in a stacked form into the receiving box 16 by opening the top plate 16A of the receiving box 16. At this time, the film strips 14 have different lengths in accordance with their different number of frames. However, the front ends of all film strips 14 are aligned as shown in FIG. 2.

In the suction transport apparatus 36, the suction cup 38 is moved by the motor 70 to the position as shown in FIG. 2 to contact the back surface of the lowermost film strip 14A. After such contact, the suction cup 38 grasps the back surface of the lowermost film strip 14A by the negative pressure from the negative pressure source 42.

As shown in FIG. 4, as the movable base 48 moves along the guide slot 56, the suction cup 38 pulls down the held portion of the lowermost film strip 14A. Therefore, an air gap is produced between the lowermost film strip 14A and the next film strip 14. The air jet supplied by the air supply source 30 through the nozzle 26 produces the air gap as shown in FIG. 5.

Therefore, the friction between the lowermost film strip 14A and the next film strip 14 becomes very small even when the lowermost film strip 14A is laterally pulled out by the suction transport apparatus 36. Therefore no damage of the film is caused because the image portion of the lowermost film strip 14A is separated from the next film strip 14.

As shown in FIG. 7, if the movable base 48 reaches the end of the stroke, the front end portion of the film strip 14A which is held by the suction cup 38 is supplied to the supply section 72.

At this time, the negative pressure due to the negative pressure source 42 is interrupted by the valve 46 thereby releasing the grasp of the film strip 14A by the suction cup 38.

At this time, the film strip 14A is fed to the printing section 94 by the driving force of the drive roller 74. Then the film strip 14A passes between the guide walls 98 and 100 in FIG. 3 and between the negative film carrier 106 and the guide path 92, and is positioned on the optical axis 122. Then the frame image of the film strip 14A is illuminated with light from the light source 102 and the transmitted light is exposed on the printing paper 116 and then the film strip 14A is pulled out by the driving roller 134.

The negative film carrier 106 is selected in accordance with the size of the film strip 14 and the size of its aperture 108 can be automatically changed. It is desirable that the size of the frame image is substantially equal to the size of the aperture 108. Therefore, the area covered by the two-dimensional image sensor 128 includes not only the frame image of the film strip 14 but also the non-transparent portions of the negative film carrier 106. Therefore, examples of the image information in the area covered by the two-dimensional image sensor 128 are shown in FIG. 11(A) for 110-size film and in FIG. 11(B) for 135 full-size film. In FIGS. 11(A) and (B) the dotted line indicates the aperture 108.

The size of the aperture 108 corresponds to the frame size of the film strip 14, and the area of the aperture 108 can be detected by counting the number of picture elements have zero density. As a result the frame size of the film strip 14 can be detected.

In this case, the optical axis of the two-dimensional image sensor 128 is substantially directed to the center of the aperture 108 and the surface of the image sensor 128 is disposed in parallel with the surface of the film strip 14. Thus, it is possible to detect the frame size of the film strip 14 in comparison with a predetermined value for each size by counting the picture elements with zero density and comparing the count to predetermined values for each possible frame size. This counting and comparison can be accomplished by means of hardware or software.

On the other hand, even in the case where a one-dimensional image sensor is used, a detection of the size can be achieved by counting the number of picture elements with zero density aligned with either the abscissa or ordinate in FIGS. 11(A) and (B). In case of 135 half-size film, the printing operation is effected in such a manner that the frame of 135 half-size film is rotated by 90° with respect to the case of 135 full-size film. Therefore there is no problem in discriminating 135 half-size film from 135 full-size film.

As mentioned above, the frame size of the film strip 14 can be detected in such a manner that the density information of the entire frame image is detected by the two-dimensional image sensor 128 and the number of the picture elements with zero density is counted to detect the region of zero density corresponding to the size of the aperture 108 of the negative film carrier 106. If the number of elements of zero density is 24 as shown in FIG. 11(A), the frame size of the film strip can be detected as 110-size film. The number of elements of zero density for 110-size film may be any number within a region of 20 to 28. Similarly, if the number of the zero density elements is 96 as shown in FIG. 11(B), the frame size of the film strip can be detected as 135 full-size film. The number of elements of zero density for 135 full-size film may be set between 82 and 110.

The information on the frame size of the film strip, thus obtained, is transmitted to the printing section. An equation is calculated for determining the amount of exposure light to be selected. Alternatively, the amount of exposure light is determined by using a predetermined equation. Then a printing operation is carried out in accordance with the frame size. The frame size information of the film strip 14 may be visually detected and input by an operator.

Figures 12A, 12B:
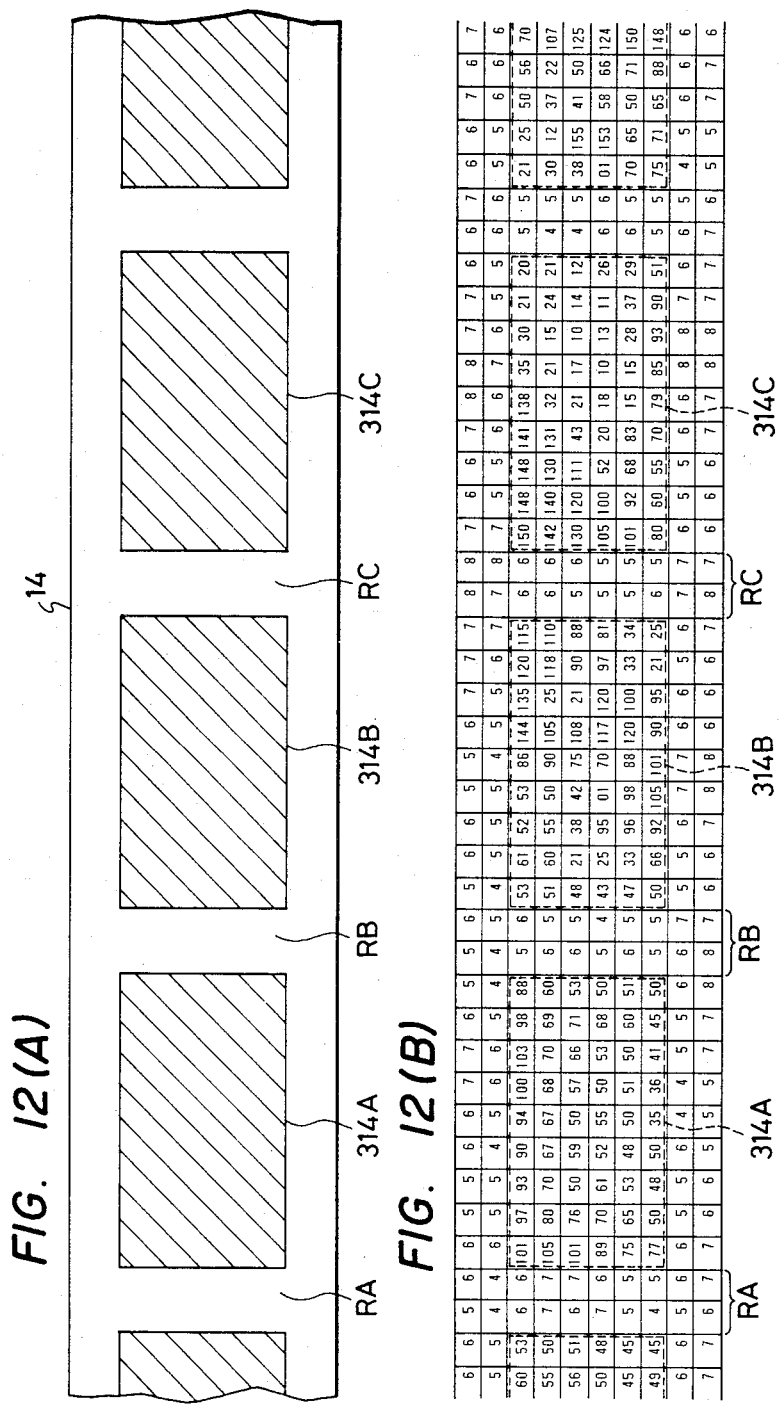
FIGS. 12 (A) and (B) are views showing the original negative film strip and the example of the image density information corresponding to the original negative film strip.

In the printing operation, it is necessary to precisely position each of the image frames 314A, 314B, 314C . . . of the film strip 14, as shown in FIG. 12(A), on the negative film carrier 106. Namely, after the printing operation of one image frame was effected, the next image frame to be printed has to be moved and correctly stopped or positioned on the negative film carrier 106. Hitherto, such placement of the image frame was effected in such a manner that a notch was provided on the margin of each frame of the film strip and the notch was detected by an automatic notch detector for precisely stopping the movement of the film strip at the predetermined position.

With respect to the original negative film strip 14 having image frames as shown in FIG. 12(A), the two-dimensional image sensor 128 provides the density information as shown in FIG. 12(B) in which each of image frames 314A, 314B, 314C . . . is detected and the non-photographed regions RA, RB, RC . . . located between the image frames are also detected. Thereby the positioning of the image frames 314A, 314B, 314C . . . can be detected and the film strip 14 is precisely stopped. However, if all of the detected density information is used for the detection and stopping operations, much time is required for calculating the information data. In this case, it is undesirably required to increase the computing speed of the controller, such as the microcomputer, thereby increasing a cost of the apparatus. Furthermore, it is a drawback that in the case of detecting the density information over the entire image using the two-dimensional image sensor 128, it is difficult to obtain precise information at the periphery of the image frame due to the aberration of the lens. In order to remove the drawback, there is presented a method illustrated in FIG. 10(A). In the method, only the image data located in a line-like portion 401 at the central portion of the two-dimensional image sensor 128 and elongated in the direction perpendicular to the film feeding direction is electronically fetched. The edge of each frame of the film strip 14 is detected by using the line-like portion 401. According to this method, there is an advantage in that in the case of the line-like portion 401 located at this central portion of the imaging section 201 of this two-dimensional image sensor 128, the image density information on one line can be selectively processed even upon changing the frame size of the film strip. In the case where the leading edge of a 135 full-size film is detected, when the image information on the same line is utilized, the detection of small size film such as 110-size film becomes difficult. It is not necessary for the detection of the film size as well as the detection of the film's leading edge to use the two-dimensional image sensor. It may be possible to use a single one-dimensional image sensor, i.e., a line-like portion, or plural one-dimensional image sensors which are arranged side by side.

Figure 13A:
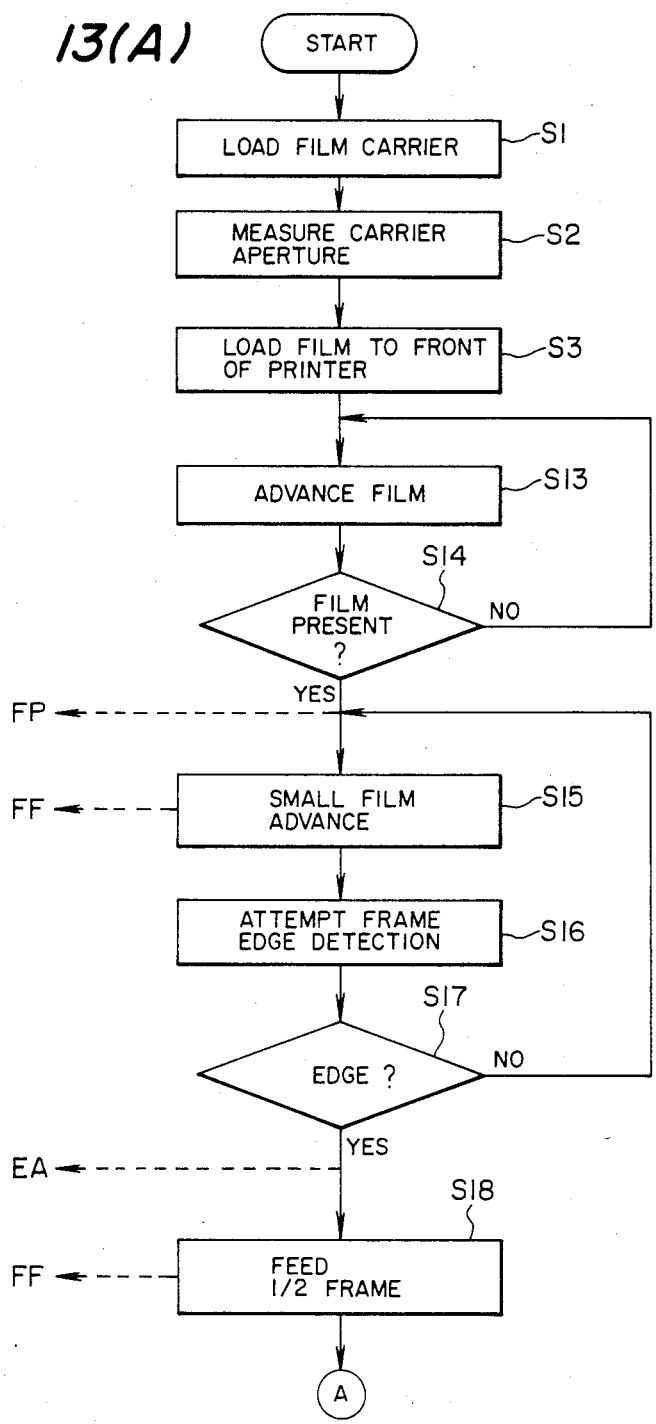
FIGS. 13 (A) and (B) are flowcharts showing the photographic printing operation of the photographic printing apparatus of the present invention.
Figure 13B:
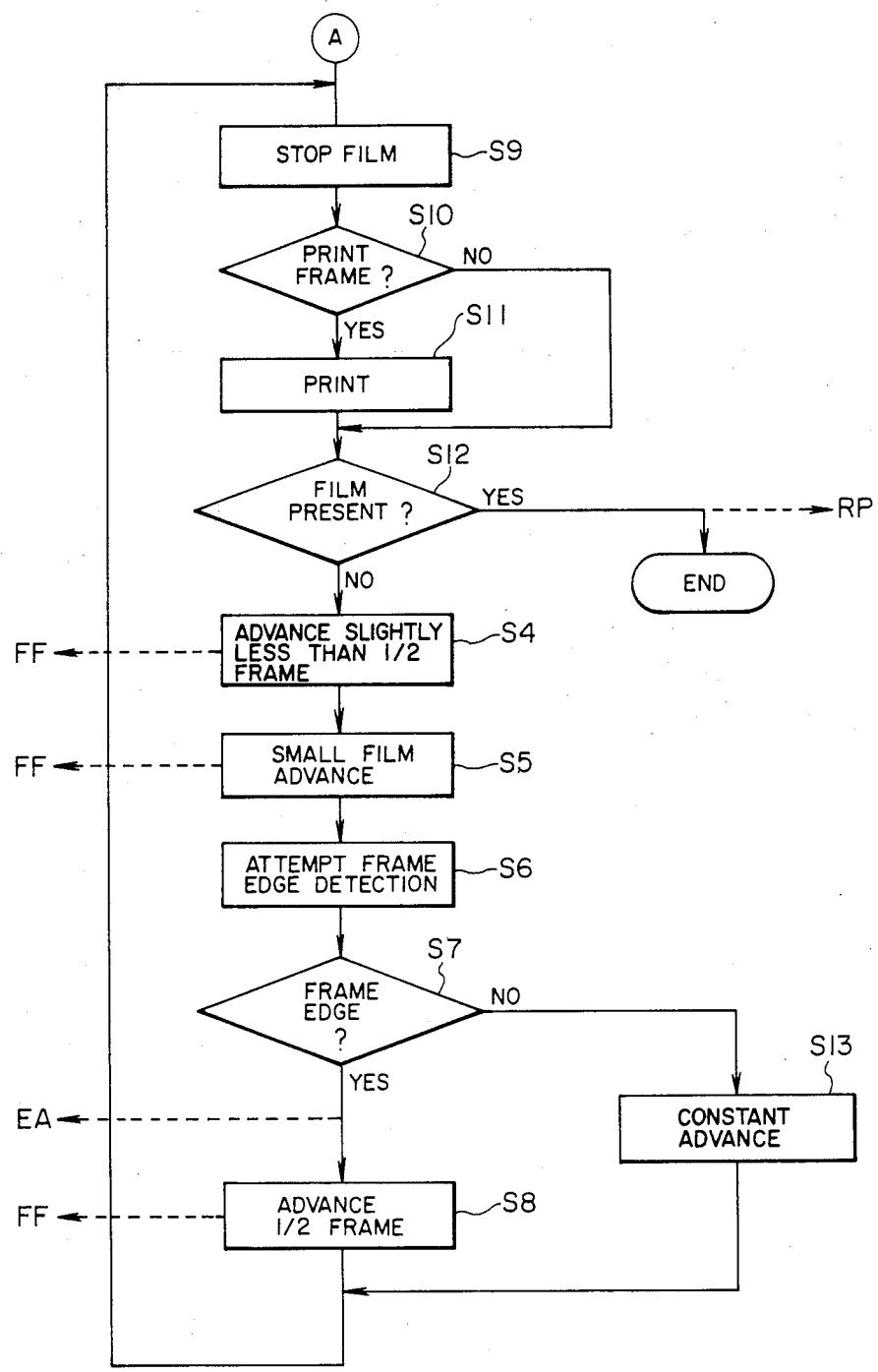

Referring to FIG. 13(A), a flowchart of a method of detecting and stopping the film strip 14 is shown. A negative film carrier 106 of proper aperture size in view of the frame size of the film strip 14 is located at a predetermined position of the printing section (Step S1 in FIG. 13(A)), and the size of the aperture 108 of the carrier 106 is measured by the two-dimensional image sensor 128 by means of the above described method (Step S2). The measurement of size may alternatively be performed visually by the operator. In accordance with the measured size, the distance of the feeding steps for transporting the film strip 14 is controlled and the amount of exposure light is controlled.

Next, the film strip 14 to be printed is supplied from the supply device 10 to the photographic printing device 12 and the end point (leading edge) of the film strip 14 is placed at the nip of the entry driving roller 74 (Step S3). The film strip 14 is repetitively fed by the driving motor 80 (Step S13). The existence of the film strip 14 is detected by the two-dimensional image sensor 128 (Step S14). If no film is present, the advancing step (Step S13) is repeated. Once the leading edge of the film strip 14 is detected, the film strip 14 is finely advanced at slow speed (Step S15) at which point detection of the leading edge of the first frame is attempted (Step S16) using the image density information corresponding to at least the line-like portion 401 of the two-dimensional image sensor 128. If it is determined that no edge is detected (Step S17) the film is again finely advanced. In this slow advance, the density data for each picture element as shown in FIG. 12(B) is obtained.

As is apparent from the correspondence between FIGS. 12(A) and 12(B), there is a remarkable difference in the density values between the image frames 314A, 314B, 314C . . . and the non-photographed region RA, RB, RC . . . between the frames. Therefore the respective non-photographed regions RA, RB, RC . . . can be detected as an edge of the respective image frame 314A, 314B, 314C . . . in such a manner that the region having an abrupt change in the feed direction of the film strip and being nearly constant in the direction perpendicular to the feed direction is searched by the line-like portion 401 of the two-dimensional image sensor 128.

Figure 14:
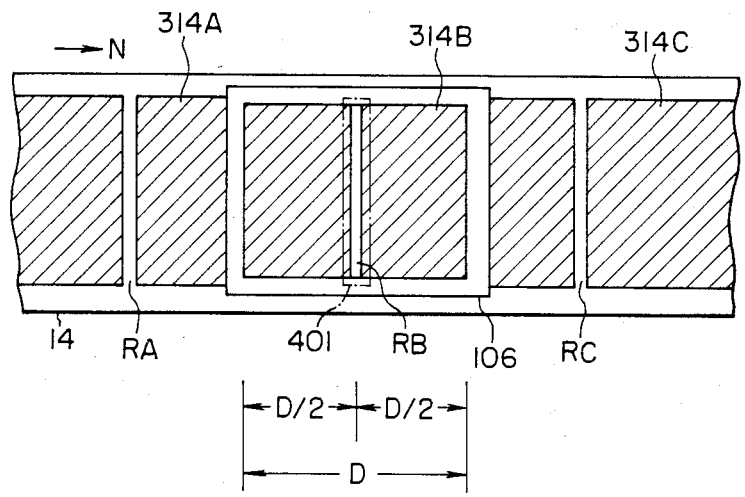
FIG. 14 is a plan view showing a negative film carrier section with respect to the feeding of the original negative film strip.
Figure 17:
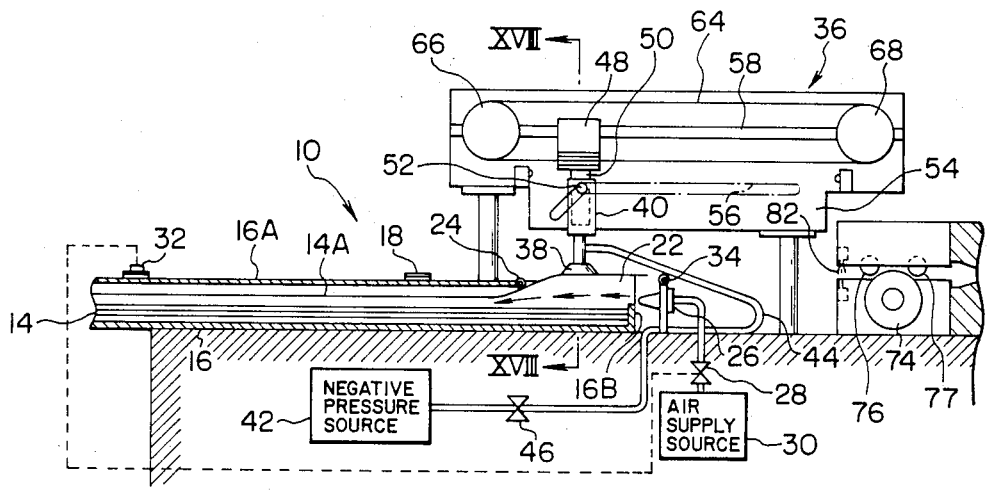
FIGS. 15 to 19 are views showing a modification of the film strip supply section of the first embodiment.
Figure 18:
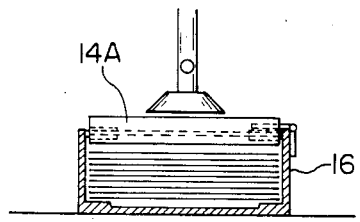
Figure 15:
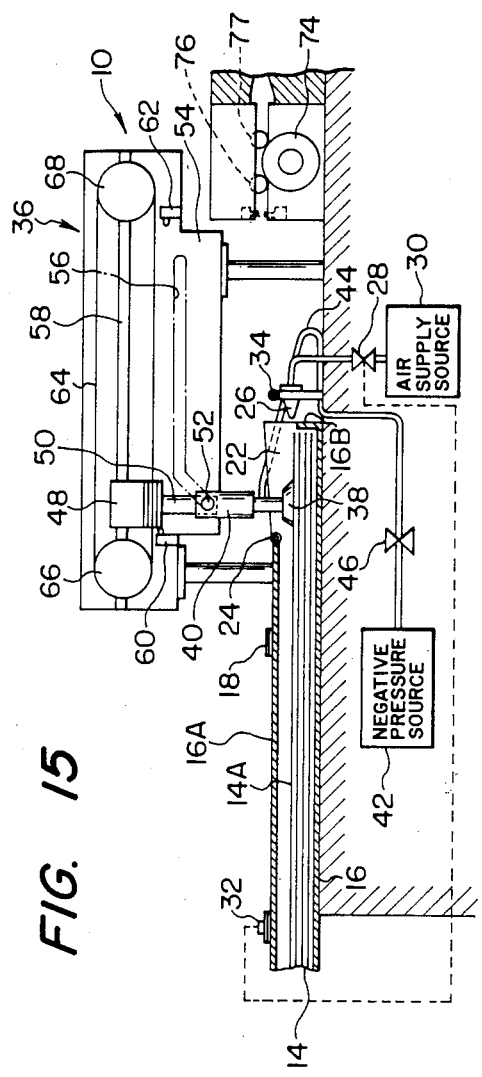
Figure 16:
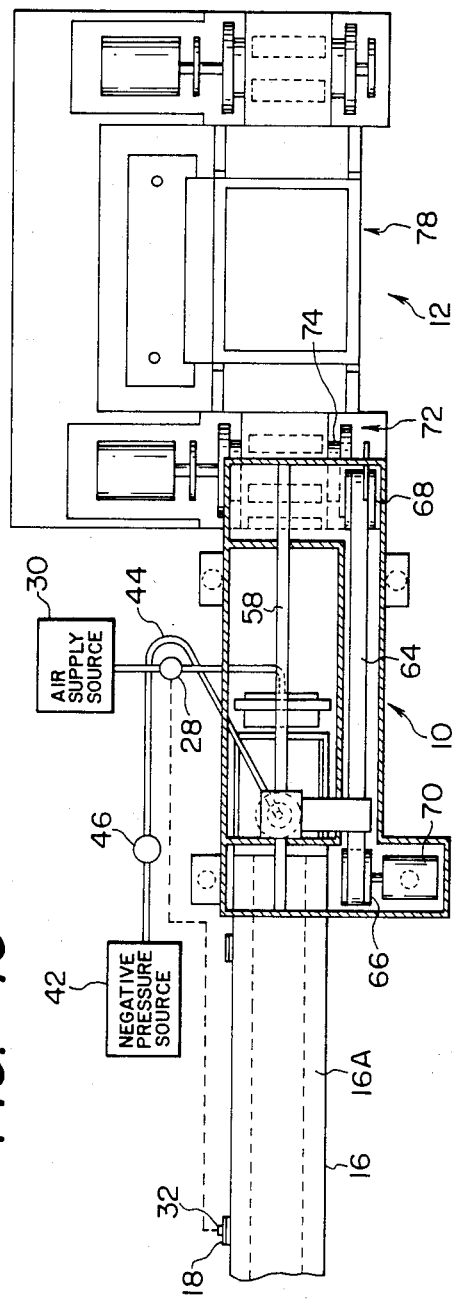
Figure 19:
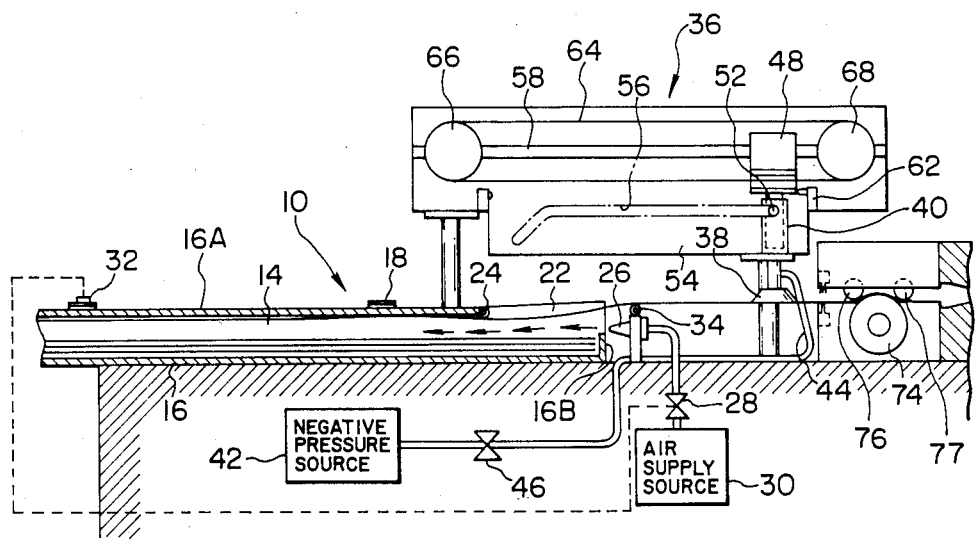

Referring to FIG. 14, such a search operation for the edge is explained. The film strip 14 is fed toward the negative film carrier 106 of the printing section in the direction N. The edge, i.e., non-photographed region RA, is detected by the line-like portion 401 of the image information detecting device 126. The line-like portion 401 is located at the central portion of the negative film carrier 106.

For the sake of explanation, the width of the edge (RA) is illustrated on an enlarged scale in FIGS. 14 and 12(B), but the width of the edge is very small in actuality. However, such an edge can be detected even by a sensor having a poor resolution power of about 1 mm on the film strip 14.

By using a sensor having a small resolution power for the detection of the edge, the output from the sensor does not shown an abrupt change even between the image portion and non-image portion. The film strip 14 is fed with a fine pitch of about 0.1 mm. The width of the line-like portion 401 in the feed direction is set to be equal to the width of one picture element in the feed direction. The edge can be detected when the sequential output signal from a single line-like portion 401 is changed in the reverse direction (density decreased) or the amount of change becomes zero. Alternatively, two line-like portions 401 are arranged side by side and the output signal is their relative difference. Then the edge is detected when the sequential output signal is changed in the reverse direction or the value of change becomes zero.

Referring back to FIG. 13(A), the film strip 14 is finely fed at slow speed until the leading edge of the first frame is detected (Steps S15, S16 and S17). When the leading edge of the image frame RB is detected, the frame is fed by the distance D/2 on the basis of the size information obtained by the Step S2 mentioned above, where the distance D/2 is the distance required for positioning the frame at the printing section, that is, D is the longitudinal length of the frame. Then the frame is stopped (Step S9 in FIG. 13(B)). In this case, the distance (D/2) from the frame edge located at the center portion of the negative film carrier 106 to the printing section can be obtained from the frame size by calculation, and when the frame is fed or moved from the position shown in FIG. 14 by the distance D/2, the frame is precisely positioned and stopped at the printing section.

After film strip 14 is positioned and stopped (Step S9), it is judged whether the positioned frame is suitable for printing or not (Step S10). If a print is not necessary, the operation proceeds to the next step (Step S12). If a print is necessary, the frame image is exposed to the compensated light determined necessary for printing (Step S11).

The condition where no film is located on the negative film carrier 106 can be detected (Step S12) by the fact that the image density information of the aperture 108 shows zero density over the entire region as mentioned in FIG. 11(A) and 11(B). If it is judged (Step S12) that there is no film present, then the printing of the particular film strip 14 is terminated.

Furthermore, the judgment in Step S10 as to whether the positioned frame is suitable for printing or not is performed in such a manner that when the data values of all of the picture elements as shown in FIG. 10(B) is above a predetermined level of density, the frame image is not suitable for printing because of an excessively over-exposed image. Similarly, when the data values are below a predetermined level of density, the frame image is judged as an unsuitable image because of an excessively under-exposed image. Also when the data values all fall within a predetermined range of densities, the frame image is judged as a unsuitable image because of a non-photographed frame or a negative of excessively low contrast.

After the printing of a frame, in order to advance the next frame image to the printing section, the film strip 14 is fed at high speed (Step S4) by a distance slightly less than the distance D/2 which is obtained from the size information obtained in the Step S2.

The film strip 14 is fed for a short distance at low speed (Step S5) and then the frame edge detection is attempted (Step S16). When the second frame edge RB or a subsequent edge is detected (Step S7), the film strip 14 is fed by the distance D/2 and then stopped (Step S8).

By repeating the above-mentioned feeding and stopping operations it is possible to automatically print each frame image sequentially. If the no-film condition is detected in Step S12, the rotation of the driving roller 78 is automatically stopped. At this time, it is preferable to generate an alarm to indicate to the operator that the film print process has been terminated.

As mentioned above, the film print process is effected with respect to density values in the described embodiment, but it may be possible to use information based on non-logarithmic values instead of the outputs of the logarithm conversion circuit 230. Furthermore, in the described embodiment, the positioning of the frame is effected by detecting that the central portion of the frame has reached the central portion of the negative film carrier, but the present invention should not be limited thereto and the portion adjacent to the central portion may be utilized.

After the suction cup 38 releases the film strip 14, the suction cup 38 is returned to the position shown in FIG. 2 by the reverse movement of the movable base 48 as powered by the motor 70. The suction cup 38 again grasps the leading end portion of a new lowermost film strip 14A, and then transports it to the photographic printing device 12.

As mentioned above, according to the present invention, the stacked film strips in the receiving box are transported one by one, usually starting with the lowermost film strip, toward the photographic printing device 12. Therefore negative film which has just completed the development process can be easily loaded onto the topmost of the already stacked film strips.

The original negative film strip has been described as a long film strip, such as 36 exposure film. However, it may be a comparatively short film strip, such as a film of only several exposures.

Referring now to FIGS. 15 to 19, a modification of the film strip supply device described above is shown. The supply device in the first embodiment differs from the modification shown in FIGS. 15 to 19 in the fact that a topmost one 14A of the original film strips 14 stacked in the receiving box 16 is grasped by the suction cup 38 and then transported to the photographic printing device 12. In the receiving box 16, a film strip take-out opening 22 is provided between the end of the top plate 16A and the end plate 16B of the receiving box 16 so that suction cup 38 can be inserted into the take-out opening 22. According to the above difference, a suction transport means 36 is disposed at the upper portion of the receiving box 16.

The remaining elements, such as the printing section, are similar to the first embodiment described above.

In this modification, the suction cup 38 holds the topmost film strip 14A and the air jet from the nozzle 26 lifts the topmost film strip 14A from the next film strip. Therefore, the topmost film strip 14 is never bent in the width direction of the film strip in comparison with the lowermost film strip in the first embodiment mentioned above, thereby being transported easily. When the topmost film strip 14A is lifted, the top plate 16A of the receiving box 16 serves to press both edges in the width direction of the film strip, i.e., the perforated regions of the film strip. Therefore, it is not necessary for the top plate 16A to cover the entire area over the stacked film strips. Instead, the top plate 16A may cover only both side perforated regions.

In the above embodiment, the film strip has been described as an original negative film strip. Obviously, it may be a reverse film strip or any other type.

Furthermore, the photographic printing apparatus of the present invention can be applied to an apparatus in which the image picture of an original film strip is focused on a cathode ray tube to record the image picture on a recording medium such as a magnetic tape, an optical disk or a magnetic disk.

Referring now to FIGS. 20 to 24 a second part of the photographic printing apparatus of the present invention is explained hereinafter. In the photographic printing apparatus, the original film strip which has completed the printing operation is cut or divided into several pieces having a predetermined film strip length. Each of the cut strips is automatically inserted into the negative carrier sheet. For example, a single 36-exposure film strip may be cut or divided into six pieces, each of which includes six frames.

Figure 20:
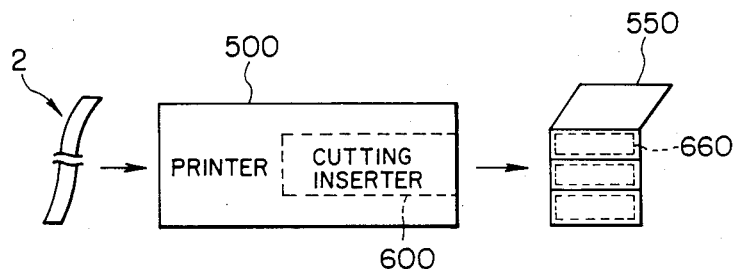
FIGS. 20 to 24 are views showing a second part of the photographic printing apparatus of the present invention.

FIG. 20 is a schematic diagram of the important elements of the second part of the photographic printing apparatus. In the diagram, a cutting inserter 600 in the photographic printing apparatus 500 cuts the film strip 2, which has completed the print operation in the photographic printing apparatus 500. Each of the film strips 2 is cut into several pieces, each of which has a predetermined length. Each piece is automatically inserted into a negative carrier sleeve 550 and then the package is removed.

Figure 21A:
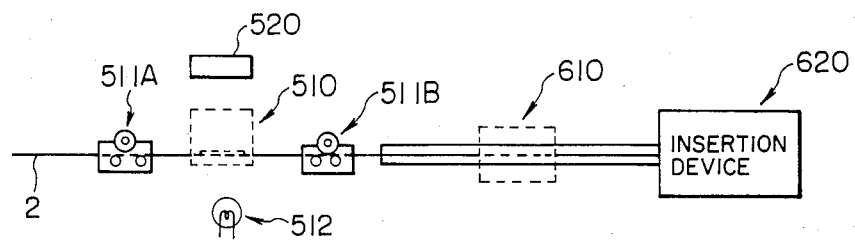
Figure 21B:
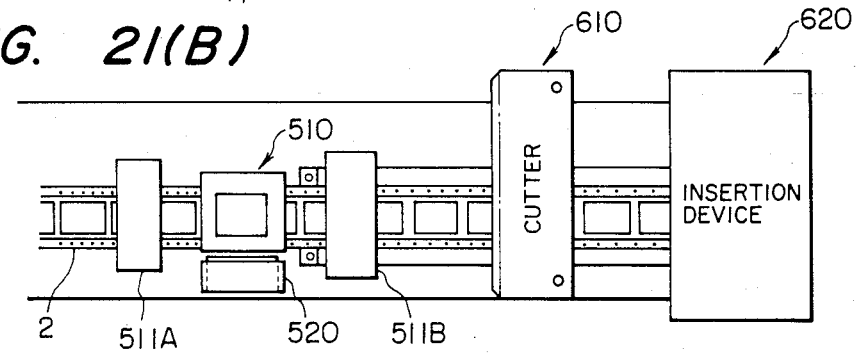

Referring to the photographic printing device 500 of FIGS. 21(A) and 21(B), an insertion device 620 is connected to the printing section 510 through an intermediate cutter 610, which may be a simple knife cutter. The original negative film strip 2 is moved to the cutter 610 by means of driving rollers 511A and 511B and is therein cut or divided into several pieces having a predetermined length. Each cut piece is automatically inserted into one of the negative carrier sleeves 550 by the insertion device 620. The printing section 510 is similar to that of the printing section 94 in the first embodiment as mentioned above. The light source 512 is similar to the light source 102 in the first embodiment.

Also similar to the first embodiment, the frame image on the film strip 2 is automatically printed on the photographic paper and the frame image is optically detected by an image information detecting device 520 to thereby control the cutter 610 and the insertion device 620.

With respect to the detection of the frame size, the transportation of the film strip, the positioning of the film strip at the negative film carrier, the feeding of the image frame at the printing section and the printing operation which are effected on the basis of the detected image density information of the film strip, explanations of these functions are omitted because they are quite similar to those of the first embodiment mentioned above.

Figure 22:
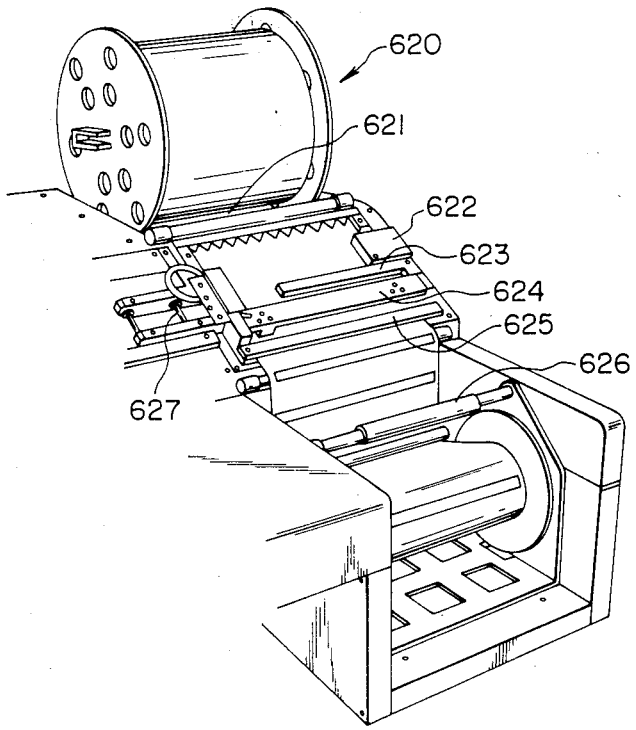

Referring to FIG. 22 the construction of the insertion device 602 is illustrated. The negative carrier sleeves 550 are supplied from a continuous roll 621 wound to a maximum length of about 500 meters with a strip-like carrier sheet of parallel sleeves 550. There are provided many rollers of different types for 135 full-size film, 135 half-size film, 126-size film or 110-size film. The negative carrier sleeve 550 supplied from the supply roll 621 is detected by a sensor 622 to automatically stop the leading end negative carrier sleeve 550 at a predetermined position.

In the case where the cut piece of film is inserted into one of the negative carrier sleeves 550, if any cut piece of the film strip has less than a fixed number of image frames, e.g., six frames, a sheet roller 623 serves to prevent the cut piece having the short length from being inserted excessively by automatically sealing the unneeded end of the negative carrier sleeve 550. The sealing position can be selectable in accordance with the length of the cut piece of the film strip. The negative carrier sleeve 550 into which the cut pieces are to be inserted is transported by the feed roller 627 and a press roller 624, and a sewing machine-like apparatus produces a line of perforations or aligned holes on the negative carrier sheet in order to easily separate the negative carrier sheets 550 into different carrier cases. If one carrier case is used to store, e.g., 36 image frames for a 36-exposure film strip and thus store six pieces each of which composed of six image frames, the perforation line is produced once per six negative carrier sleeves 550 in order to easily separate the negative carrier sleeves 550 into cases holding an entire film strip 2. The different series of carrier sleeves having perforation lines separating them into cases are wound onto a winding roller 626. The feed roller 627 is provided to feed or lead the cut strip to the inlet of one of the negative carrier sleeves 550.

As mentioned above, the film strip 2 is transported through the feeding path to the negative film carrier of the printing section 510 and the frame images are printed one by one and then the film strip is cut by the cutter 610. Therefore, according to the photographic printing apparatus, the printing operation is simultaneously effected together with the cutting operation.

Figure 23:
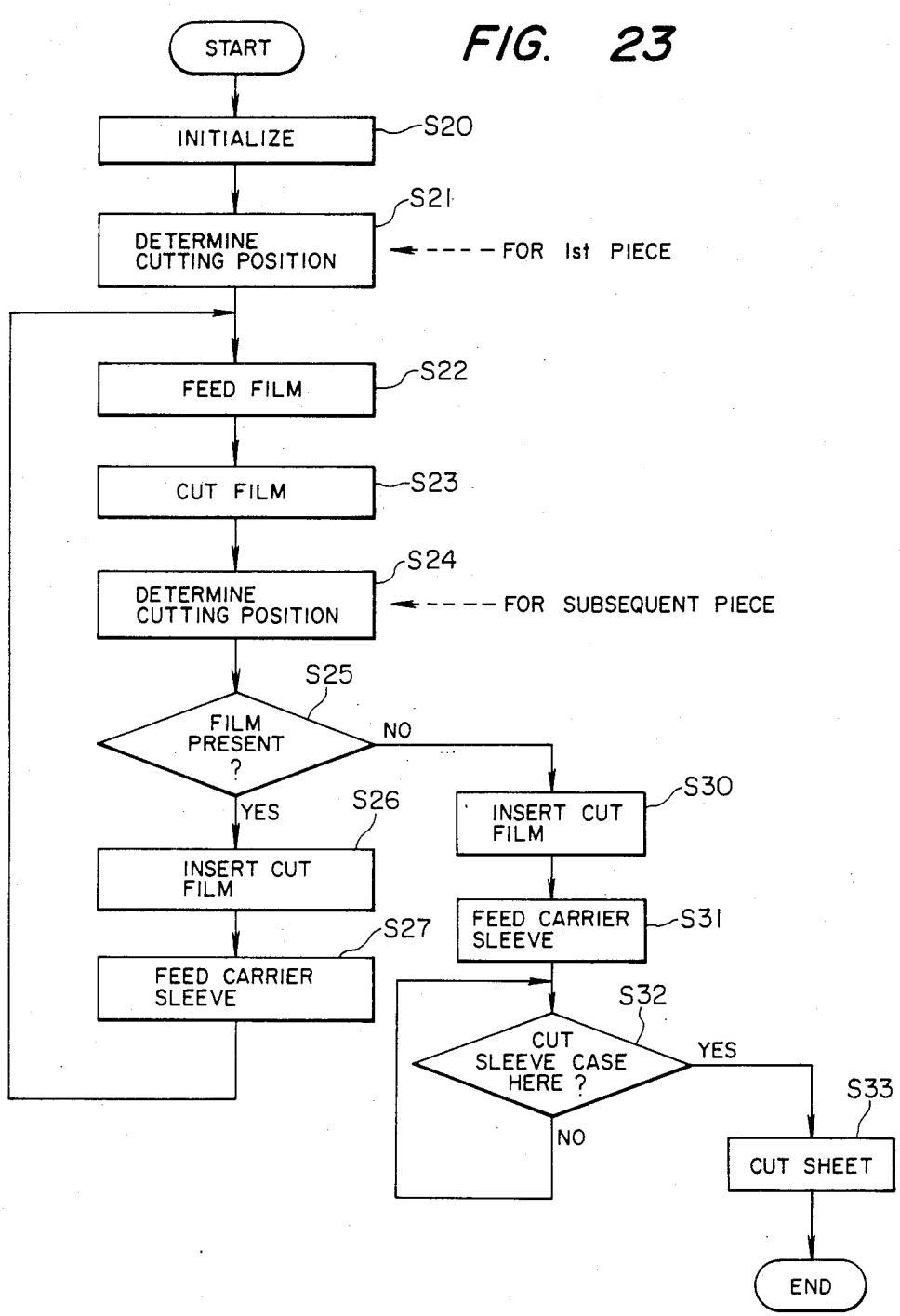
Figure 24:
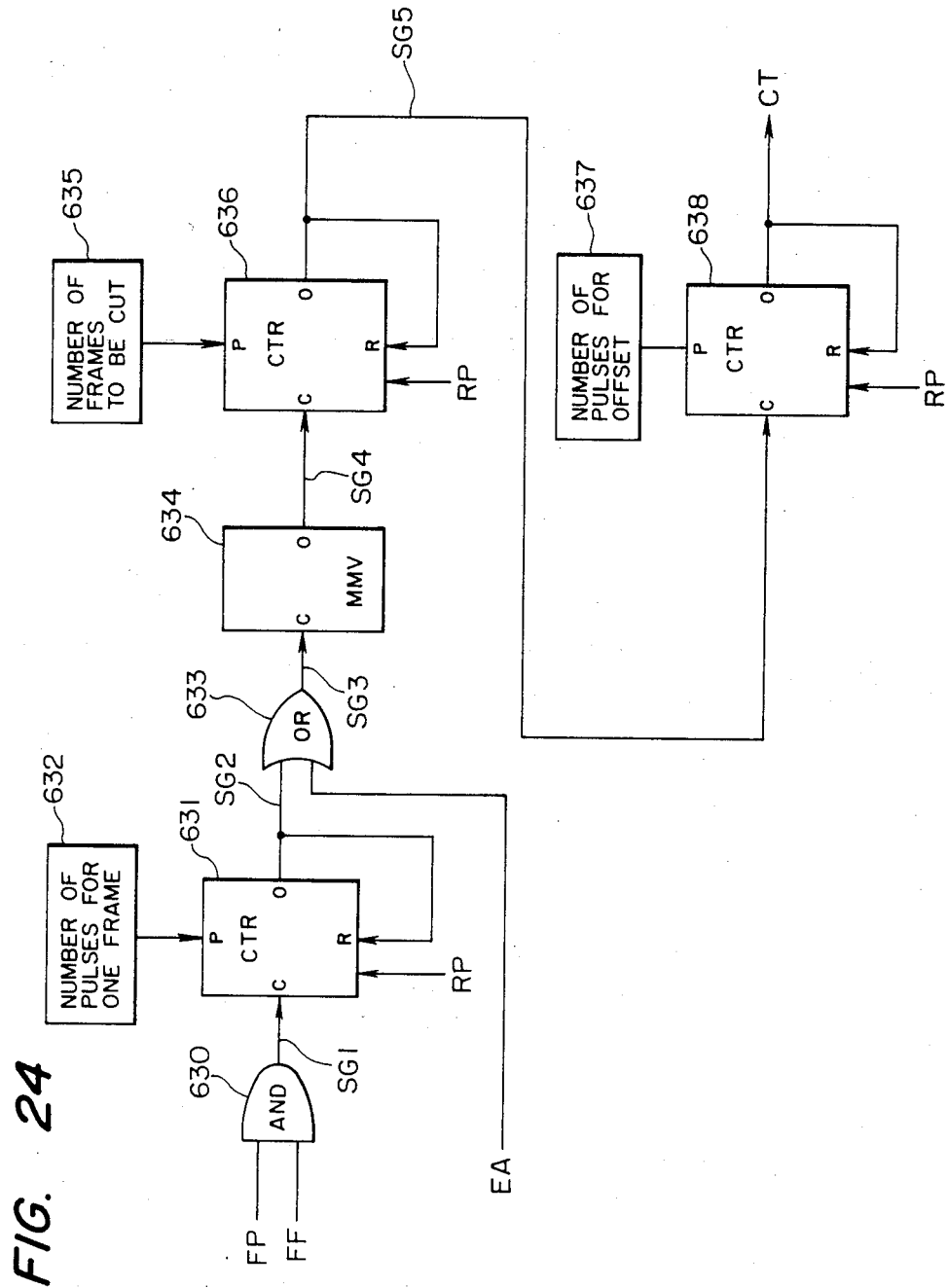

Referring to FIG. 23, the use of the cutting inserter is explained hereafter. At first, initializations, such as presetting a counter, are performed (Step S20). The film strip 2 is fed by a distance corresponding to one piece of several frames, e.g., six frames, until the last frame of a first piece is detected (Steps S21 and S22). When the last frame of the first piece is detected as mentioned hereafter, the feeding of the film strip is temporally stopped and the film strip is cut (Step S23). Then, a suitable cutting position for the second (or subsequent) piece is determined (Step S24). It is necessary for the two position determination steps S21 and S24 to perform a precise determination of the cutting position so as not to cut the image frame of the film strip. The cutting operation of the cutter 610 is actuated by a cutting signal CT which is generated by the electric circuit as shown in FIG. 24. The cutting signal CT may be generated by means of software.

Referring back to FIGS. 13(A) and 13(B), a pulse signal FP representing the fact that the film strip is present on the negative film carrier is output at Step S14. When the film strip is present on the negative film carrier, a pulse signal FF corresponding to the amount of feed of the film strip is output at the Steps S15, S18, S4, S5 and S8 at the times when the film strip is fed. A pulse signal EA representing the fact that the frame edge was detected is output at the Steps S17 and S7 in FIGS. 13(A) and 13(B). In the circuit of FIG. 24, the pulse signals FP and FF are applied to an AND circuit 630 and the output signal from the AND circuit 630 is applied to a counter 631. The counter 631 is previously set by a memory 632 with a frame pulse number 632 by which a pulse motor (not shown) is actuated by the number of pulses corresponding to one frame of the film strip 2, and the counter 631 counts the pulse signals FF until the counted number reaches the frame pulse number 632 and then outputs a signal SG2. The output signal SG2 is applied to an OR circuit 633 together with the pulse signal EA. The output signal SG3 from the OR circuit 633 is applied to a mono-multivibrator 634 which is used for preventing the generation of two or more signals for one frame. The output signal SG4 from the mono-multivibrator 634 is applied to a counter 636. The counter 636 is previously set by a memory 635 with the number of frames to be cut, e.g., six frames. Therefore when the number of the pulse signals SG4 reaches the present frame number to be cut in the memory 635, the counter outputs a signal SG5. The output signal SG5 is applied to an input of a counter 638. The counter 638 is previously set by a memory 637 with the number of times the motor is actuated when freely feeding the film strip across the distance between the sensor's position and the frame to be cut. Therefore, the counter 638 outputs the cutting signal CT when the counted number of the signal pulses SG5 reaches the pulse number of free feeding. Upon generation of the cutting signal CT, the film strip 2 is temporarily stopped and the film strip is cut at the end position of the last frame, e.g., the sixth frame, of one piece. In brief, after the film strip 2 is passed through the sensor's position by a predetermined distance and the frame edge is detected, the film strip 2 is further freely fed by the distance between the sensor's position and the cutter 610 and then the film strip is automatically cut. The cutting operation may be manually effected by an operator after the operator hears a sound from a buzzer which is actuated by the cutting signal CT. Upon completion of the cutting of the film strip a reset signal RP is output at the Step S12 of FIG. 13(B) thereby resetting the counters 631, 636 and 638 of FIG. 24.

As mentioned above, by generation of the cutting signal CT, the cutter 610 cuts the film strip 2. In step S25 of FIG. 23 it is determined whether the end of the film strip is present or not. When the end of the film is detected, the cut piece is fed to the insertion device 620 thereby inserting the cut piece into one of the negative carrier sleeves 550 (Step S30). Then the sleeve 550 including the inserted piece is fed (Step S31). Then, in Step S32 it is determined whether the sheet of negative carrier sleeves 550 should be cut or not. If it is detected that the sheet should be cut, the perforation line, similar to that produced by the sewing machine-like apparatus, is applied by using the sheet slitter 625 in FIG. 22 (Step S33), thereby completing the process for one case of the film strip 2.

If the end of the film strip is not detected in the Step S25, the cut strip of one piece is inserted into one of the negative carrier sheets (Step S26) and then the sheet including the piece is fed (Step S27), and then process is returned back to the Step S21.

The original negative film strip mentioned in the above mentioned may be not only a 135-size film but may also be a 126-size film or a 110-size film.

As mentioned above, the photographic printing apparatus according to the present invention comprises means for receiving a plurality of original negative film strips sequentially at a printing section beginning from the topmost one (or a lowermost one in the first embodiment) of a stack, a carrier section for positioning an image frame at the printing position, means mounted in the carrier section for sequentially feeding the image frame of the original negative film strip, means for optically detecting image information at the carrier section, means for controlling the transporting means and frame feeding means in accordance with the detected information from the detecting means, means for automatically cutting the film strip into several pieces having a predetermined length and means for automatically inserting the respective pieces into the negative carrier sleeve.

Since the original negative film strips are not connected to each other nor wound on a reel, no damage to the frame image is caused on the film strip and the printing operation is easily performed without the connecting and separating operations necessary with joined film strips. Furthermore, since the cutting and inserting operations are automatically effected by machines, the cutting and inserting operations are made easily and speedily.

While the present invention has been particularly described with reference to specific embodiments thereof, it is to be understood that the terms used are terms of description rather than of limitation and that changes may be made within the limits of the appended claims without departing from the true scope and spirit of the present invention in its broader aspects.

What is claimed is:

1. A photographic printing apparatus comprising;
    means for receiving a plurality of original film strips in a stack;
    means for transporting said original film strips sequentially to a printing section from an extreme side of said stack;
    a carrier section for positioning an image frame of one of said original film strips at a printing position;
    means mounted in said carrier section for sequentially feeding said image frames of said original film strip;
    means for optically detecting image information of said film strip at said carrier section; and
    means for controlling said transporting means and said frame feeding means in accordance with the detected information from said detecting means.

2. A photographic printing apparatus as claimed in claim 1, wherein said extreme side of said stack is a lowest side of said stack.

3. A photographic printing apparatus as claimed in claim 1, wherein said extreme side of said stack is a highest side of said stack.

4. The photographic printing apparatus according to claim 1, wherein said detecting means includes an image sensor.

5. The photographic printing apparatus according to claim 4, wherein said image sensor is a two-dimensional image sensor.

6. The photographic printing apparatus according to claim 1, wherein said controlling means includes means for controlling the amount of exposure light for exposing a photographic print.

7. The photographic printing apparatus according to claim 1, further comprising means for cutting said original negative film strips.

8. The photographic printing apparatus according to claim 7, wherein said controlling means controls said cutting means on the basis of the detection of frame number of said original negative film strip by said optically detecting means at said carrier section.

9. A photographic printing apparatus, comprising;
    a carrier section for positioning an image frame of an original film strip to print said image frame;
    a transporting mechanism for transporting said original film strip;
    means for optically detecting image information of said image frame at said carrier section;
    means for cutting said original film strip into several pieces each of which has a predetermined maximum number of frames;
    means for inserting and feeding each of said several pieces into a carrier sleeve; and
    means for controlling said transporting means, said cutting means and said inserting means in accordance with the image information detected by said information detecting means.

10. The photographic printing apparatus according to claim 9, wherein said controlling means includes means for controlling the amount of exposure light for exposing a photographic print.

11. The photographic printing apparatus according to claim 7, wherein said detecting means includes an image sensor, and said image information is detected as the density of plural picture elements.

12. The photographic printing apparatus according to claim 11 wherein said image sensor is a two-dimensional image sensor.

* * * * *